3,228,953
PROCESS FOR THE PRODUCTION OF
ANTHRAQUINONE DYESTUFFS
Rütger Neeff, Leverkusen, Germany, assignor to Farbenfabriken Bayer Aktiengesellschaft, Leverkusen, Germany, a German corporation
No Drawing. Filed Aug. 2, 1962, Ser. No. 214,182
Claims priority, application Germany, Aug. 5, 1961, F 34,622
4 Claims. (Cl. 260—303)

This invention relates to new anthraquinone dyestuffs and to a process for their production.

It is an object of the present invention to provide new anthraquinone dyestuffs with excellent fastness properties. Further objects will appear hereinafter.

It has been found that valuable new vat dyestuffs are obtained by condensing not less than 2 mols of an anthraquinone-2-aldehyde or of the corresponding anil with 1 mol of 2,5-diamino-1,4-dithiobenzoquinone.

As anthraquinone aldehydes or anils, principal examples are anthraquinone-2-aldehyde and the halogen-, amino-, acylamino-, alkylsulfo-, arylsulfo- and sulfonamide derivatives thereof, or the corresponding anils as well as anthraquinone-2-aldehydes with condensed rings attached, such as for example 1,9-thiazolanthrone-2-aldehyde or the anil thereof. These include 1-chloroanthraquinone-2-aldehyde, 1-aminoanthraquinone-2-aldehyde, the 6-chloro-, 7-chloro, 6,7-dichloro-, 6- or 7-chloro-, fluoro- and bromo derivatives thereof, its 6- or 7-alkyl- or -arylsulfo- or 6- or 7-sulfonamide derivatives and the corresponding anils. Furthermore, there may be mentioned the 4- or 5-acylamino-1-aminoanthraquinone-2-aldehydes or the anils thereof, in which the acyl radicals may be derived, for example, from the following carboxylic acids: benzoic acid, 2-, 3-, 4-chloro-, -bromo-, -fluoro-, -methyl- or -methoxy-benzoic acid, 2,4- or 2,5-dichloro- or 3,4-dibromo-benzoic acid, benzoic acid-3- or -4-alkylsulfone, benzoic acid-4-sulfonamides, cinnamic acid, optionally halogen-substituted diphenyl-4-carboxylic acids, naphthalene carboxylic acids, and anthraquinone-2-carboxylic acids which may be substituted by nitro- or amino groups. The dyestuffs from 4- or 5-acylamino-1-aminoanthraquinone-2-aldehydes or from the anils thereof can also be prepared by condensing the 1,4- or 1,5-diaminoanthraquinone-2-aldehydes or the anils thereof with 2,5-diamino-1,4-dithiobenzoquinone and carrying out a subsequent acylation with acid halides, for example the acid halides of the acids listed above.

It is also possible, of course, to employ a mixture of two anthraquinone aldehydes or anils thereof carrying different substituents for the preparation of the corresponding asymmetric dyestuffs or dyestuff mixtures. If the 1-chloroanthraquinone-2-aldehyde or its anil is used as a component of the condensation, the chlorine atoms of the resulting dyestuffs can be exchanged for amino groups by reaction with p-toluene sulfonamide and subsequent saponification. A dyestuff is thus obtained which is identical with the product obtained from the 1-aminoanthraquinone-2-aldehyde.

The production of the dyestuffs is carried out by heating the anthraquinone aldehydes or the anils thereof with 2,5-diamino-1,4-dithiobenzoquinone in inert organic solvents to about 80–200° C. Suitable solvents are, for example, halogenated benzene hydrocarbons such as o-dichlorobenzene, nitrobenzene, methylnaphthalene, glacial acetic acid, alcohols such as for example alkanols, and glycolethers such as for example ethyleneglycol monoethyl ether, or the esters thereof such as for example the acetate, dimethyl formamide or -sulfoxide, pyridine, alkylpyridines such as for example picoline, and mixtures thereof.

It is of particular importance that it is not necessary in order to carry out the process according to the invention, to use the substituted free anthraquinone aldehydes, which are difficult to obtain, but that it is possible to start from the corresponding aldehyde anils which are easily accessible, for example, by oxidation of corresponding methylantharquinones by means of nitrobenzene.

The resulting anthraquinone dyestuffs are employed as such or in the form of leuco ester salts, obtainable in known manner, for the dyeing or printing of animal or preferably vegetable or artificial fibres, for example for wool, silk, but especially for cotton, linen, regenerated cellulose, artificial silk or polyamide- or polyurethane-fibres. Yellow, red, blue, grey and green dyeings or prints are achieved which are distinguished by very good fastness to wet processing, resistance to dropping water and especially by high fastness to light and great intensity of colour.

The following examples are given for the purpose of illustrating the invention.

Example 1

15 parts of 1-aminoanthraquinone-2-aldehyde anil and 3.9 parts of 2,5-diamino-1,4-dithiobenzoquinone in 120 parts of dimethylformamide and 20 parts of glacial acetic acid are heated to boiling for 5 hours. After cooling, the resultant product is filtered off with suction and the solvent is removed in the usual manner. The dyestuff obtained crystallizes in boiling nitrobenzene in the form of small bluish-red needles, shows a blue-violet vat liquor and possesses according to analysis the following formula:

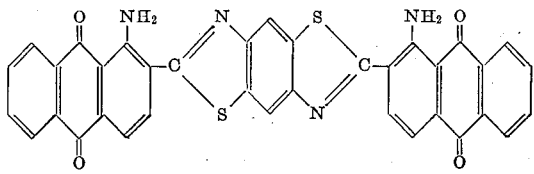

0.2 g. of the dyestuff are added at 50° C. to 200 cc. of a dye liquor consisting of 1.4 cc. of sodium hydroxide solution (38° Bé.), 0.8 g. of hydrosulphite, 4 g. of sodium sulphate and the appropriate quantity of water. Vatting is allowed to take place for 15 minutes at 50° C. and a pre-wetted hank of cotton (10 g.) is subsequently dyed from the blue-violet vat liquor for about 45 minutes at 50° C. The dyeing is then squeezed off, oxidised by exposure to air, then rinsed thoroughly and acidified with a solution of 4 g. of acetic acid per litre. The rinsed material is soaped for 15 minutes in the customary way while boiling, rinsed and dried. A clear, bluish-bordeaux coloured dyeing is obtained which is distinguished by very good fastness to wet processing and to light as well as by the covering of dead cotton.

When using for the preparation of the dyestuff, instead of the above mentioned 1-aminoanthraquinone-2-aldehyde anil, its 6- or 7-methyl- or -ethylsulpho-, 6- or 7-phenylsulpho- or 6- or 7-sulphonamide derivatives, which can also be substituted at the amide nitrogen by one or two methyl- or ethyl-groups, likewise bluish-bordeaux dyeing products with excellent fastness properties are obtained.

Example 2

16.6 parts of 6-chloro-1-aminoanthraquinone-2-aldehyde anil and 3.9 parts of 2,5-diamino-1,4-dithiobenzoquinone are heated to boiling in 130 parts of dimethylformamide and 25 parts of glacial acetic acid until the reaction is finished. After the solvent has been removed in the customary manner, the dyestuff dyes cotton from the bluish-violet vat liquor in bluish-bordeaux tones which are somewhat more blue than those of the dyestuff described in Example 1, and possesses the following constitution:

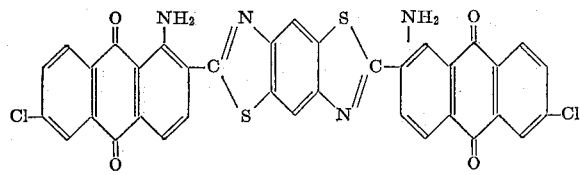

Products with similar dyeing properties are obtained by using, instead of 6-chloro-1-aminoanthraquinone-2-aldehyde anil, equivalent quantities of the 7-chloro-, 6- or 7 - chloro- or 6,7 - dichloro - 1 - aminoathraquinone-2-aldehyde anil, or corresponding bromo- or fluoro-derivatives.

Example 3

20 parts of anthraquinone-2-aldehyde and 7.2 parts of 2,5-diamino-1,4-dithiobenzquinone are heated to boiling in 150 parts of dimethylformamide until the formation of the dyesuff is completed. After the product has been isolated, a dyestuff is obtained which dyes cotton from an olive coloured vat liquor a clear greenish-yellow colour with very good fastnesesses. The analysis of the dyestuff shows the following constitution:

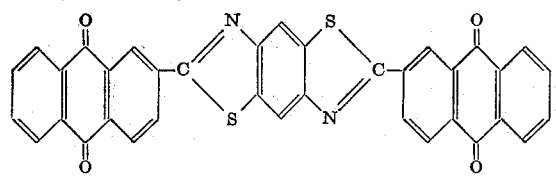

The condensation may be carried out, instead of in dimethylformamide, with equal results in solvents such as o-dichlorobenzene, nitrobenzene, methylnaphthalene, glacial acetic acid, dimethylsulphoxide, glycolmonoethyl ether or glycolmonomethyl ether acetate, or in mixtures thereof.

Example 4

7.3 parts of anthraquinone-2-aldehyde are converted into the anil by heating with 3 parts of aniline in 120 parts of dimethylformamide and 10 parts of glacial acetic acid. The mixture is treated with 10 parts of 1-aminoanthraquinone-2-aldehyde anil and 5.2 parts of 2,5-diamino-1,4-dithiobenzoquinone and heated to boiling until formation of the dyestuff in small brown needles does not increase any more. The product obtained dyes cotton from a blue vat liquor in ruby tones and is likely to have the following formula:

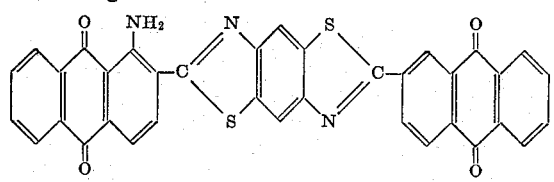

Example 5

15 parts of 1-amino-4-benzoylamino-anthraquinone-2-aldehyde anil and 2.9 parts of 2,5-diamino-1,4-dithiobenzoquinone are heated to boiling in 130 parts of dimethylformamide for 2 hours. The condensation product formed is isolated in known manner and crystallizes from boiling nitrobenzene in small blue needles. The product dyes cotton from a greenish-blue vat liquor in intensely greenish-blue tones which are distinguished by very good fastness to wet processing and outstanding fastness to light. According to analysis, the dyestuff possesses the following constitution:

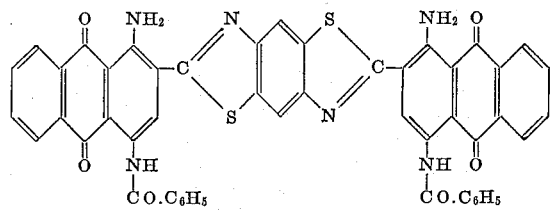

Dyestuffs with similar dyeing properties are obtained by using, instead of the 1-amino-4-benzoylamino-anthraquinone-2-aldehyde anil, 1-amino-4-(o-chloro-)-, -4-(m-chloro)- or -4-(p-chloro)-benzoylamino-anthraquinone-2-aldehyde anil or corresponding 1-amino-4-fluoro- or -bromobenzoylamino-anthraquinone-2-aldehyde anils.

Example 6

34.1 parts of 1,4-diaminoathraquinone-2-aldehyde anil are heated to boiling with 8.5 parts of 2,5-diamino-1,4-dithiobenzoquinone in 300 parts of dimethylformamide and 20 parts of glacial acetic acid, until formation of the intermediate product of the formula

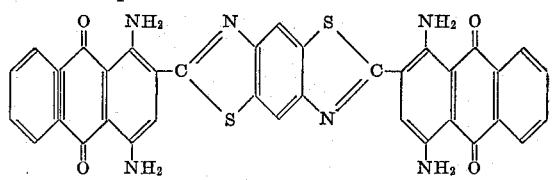

is completed. By subsequent acylation of 30 parts of the intermediate product in 360 parts of nitrobenzene by addition of 20.6 parts of 2,4-dichlorobenzoylchloride at 80–100° C. and by heating the reaction mixture to 160–205° C., a dyestuff of the formula:

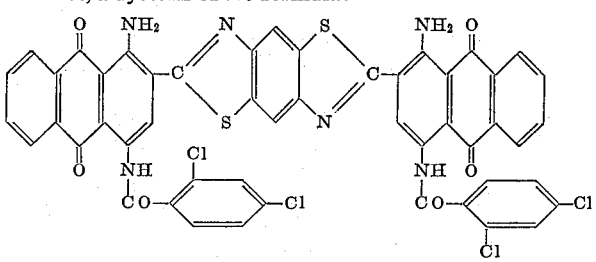

is obtained which dyes cotton from a blue vat liquor in clear, intensely greenish-blue tones with excellent fastness properties. A dyestuff with similar dyeing properties is obtained by employing, instead of the 2,4-dichlorobenozyl-chloride, an equivalent quantity of m-trifluoromethyl-benzoyl fluoride.

Example 7

16 parts of the intermediate product described in Example 6 in 200 parts of nitrobenzene are treated at 80–100° C. with 11.5 parts of diphenyl-4-carboxylic acid chloride and heated to 180–205° C. until the acylation is finished. The resulting dyestuff of the formula

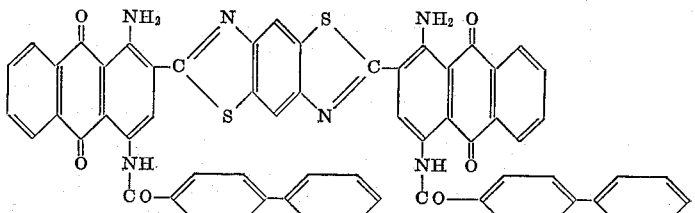

dyes cotton from a blue vat liquor in greenish-blue shades.

Example 8

8.9 parts of 1-amino-4-benzoylamino-anthraquinone-2-aldehyde anil, 6.5 parts of 1-aminoanthraquinone-2-aldehyde anil and 3.4 parts of 2,5-diamino-1,4-dithiobenzoquinone are heated to boiling in 130 parts of dimethylformamide and 20 parts of glacial acetic acid for about 3–5 hours. The dystuff, isolated in known manner, of the probable formula

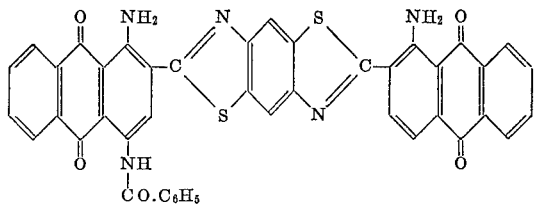

dyes cotton from a blue vat liquor in intense dark-blue tones which are distinguished by very good fastness to wet processing, outstanding fastness to light and to dropping water. By using an equivalent quantity of 1-amino-4-(p-methoxybenzoylamino) - anthraquinone-2-aldehyde anil, instead of 1 - amino-4-benzoylamino-anthraquinone-2-aldehyde anil, a somewhat greenish-dark blue dystuff of similar dyeing properties is obtained.

Example 9

16.1 parts of 1-amino-4-benzoylamino-anthraquinone-2-aldehyde anil, 1.3 parts of 1-aminoanthraquinone-2-aldehyde anil and 3.4 parts of 2,5-diamino-1,4-dithiobenzoquinone are heated to boiling in 130 parts of dimethylformamide and 20 parts of glacial acetic acid, until formation of the dystuff is completed. The resulting mixture of dystuffs, consisting of the dyestuffs described in Examples 1, 5 and 8, dyes cotton from a blue vat liquor in a greenish-dark blue colour which is resistant to dropping water and possesses excellent fastness to wet processing and to light.

Example 10

15 parts of 1-amino-5-benzoylamino-anthraquinone-2-aldehyde anil and 2.9 parts of 2,5-diamino-1,4-dithiobenzoquinone are heated to boiling in 130 parts of dimethylformamide and 20 parts of glacial acetic acid for about 4–5 hours. The product formed is filtered off with suction and freed from the solvent in the usual manner. The resulting dyestuff of the formula

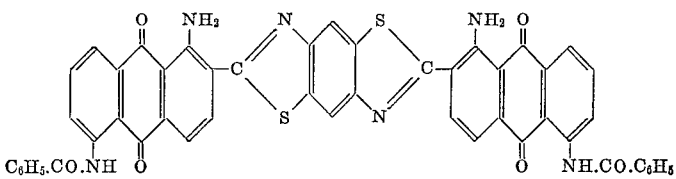

dyes cotton from a blue vat liquor in currant coloured tones of good fastness properties. When using, instead of the 1-amino-5-benzoylaminoanthraquinone-2-aldehyde anil, an equivalent quantity of 1-amino-5-(p-ethylsulphonylbenzoylamino)-anthraquinone-2-aldehyde anil, a dyestuff with similar dyeing properties is obtained.

Example 11

7.5 parts of 1-amino-5-benzoylamino-anthraquinone-2-aldehyde anil and 7.5 parts of 1-amino-4-benzoylamino-anthraquinone-2-aldehyde anil are heated to boiling with 2.9 parts of 2,5-diamino-1,4-dithiobenzoquinone in 130 parts of dimethylformamide and 20 parts of glacial acetic acid, until the formation of the dyestuff does not increase any more. The dyestuff, isolated in known manner, of the formula

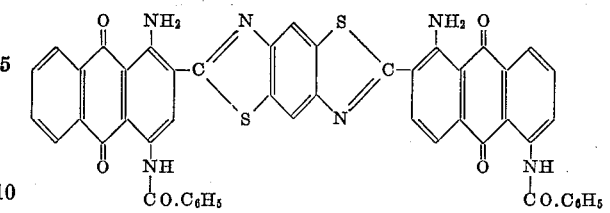

dyes cotton from a blue vat liquor in navy-blue tones, resistant to dropping water, of excellent fastness to light and wet processing.

Example 12

15 parts of thiazolanthrone-2-aldehyde anil are heated to boiling with 3.75 parts of 2,5-diamino-1,4-dithiobenzoquinone in 150 parts of dimethylformamide and 10 parts of glacial acetic acid for 5 hours. The precipitated yellow dyestuff of the formula

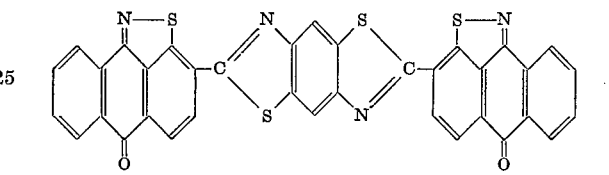

is isolated in known manner. The dyestuff dyes cotton from an olive-brown vat liquor a clear yellow of good fastness properties.

Example 13

4.7 parts of anthraquinone-2-aldehyde are converted into the corresponding anil by heating with 120 parts of dimethylformamide, 10 parts of glacial acetic acid and 2 parts of aniline. The mixture is treated with 9.6 parts of 1-amino-4-benzoylamino - anthraquinone-2-aldehyde anil and 3.4 parts of 2,5-diamino-1,4-dithiobenzoquinone and heated to boiling for about 5 hours. The dyestuff which has the following probable constitution

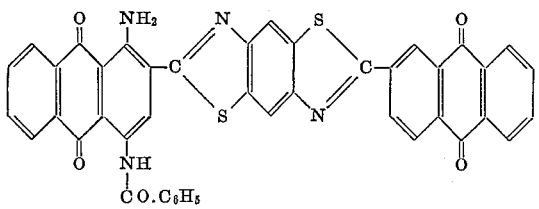

is isolated in the usual way. The dyestuff dyes cotton from a blue vat liquor in bluish-green tones which possess excellent fastness to light and wet processing. If 1-amino-5-benzoylamino-anthraquinone-2-aldehyde anil is used for the condensation, instead of 1-amino-4-benzoylamino-anthraquinone-2-aldehyde anil, a dyestuff is obtained which dyes cotton from a blue vat liquor in chestnut-color tones.

I claim:
1. Process for the production of anthraquinone dyestuffs by a one step condensation reaction comprising contacting not less than 2 mols of a member selected from the group consisting of an anthraquinone-2-aldehyde and the corresponding anil with about 1 mol of 2,5-diamino-1,4-dithiobenzoquinone.

2. A process for producing anthraquinone dyestuffs by a one step condensation reaction comprising contacting not less than 2 mols of a member selected from the group consisting of an anthraquinone-2-aldehyde and the corresponding anil with about 1 mol of 2,5-diamino-1,4-dithiobenzoquinone at a temperature of about 80–200° C.

3. Process according to claim 2 which comprises carrying out the condensation in an inert organic solvent.

4. A process of claim 3 wherein the reaction is effected in an inert reaction solvent selected from the group consisting of halogenated benzene hydrocarbons, glacial acetic acid, alkanols and, glycol ethers.

References Cited by the Examiner
UNITED STATES PATENTS

| | | | |
|---|---|---|---|
| 2,045,817 | 6/1936 | Zerweck et al. | 260—303 |
| 2,807,622 | 9/1957 | Holbro et al. | 260—303 |
| 2,868,799 | 1/1959 | Neeff | 260—303 |

NICHOLAS S. RIZZO, *Primary Examiner.*